United States Patent
Karlov et al.

(10) Patent No.: US 7,639,263 B2
(45) Date of Patent: Dec. 29, 2009

(54) FAST FILTERED YUV TO RGB CONVERSION

(75) Inventors: Donald Karlov, North Bend, WA (US); Gilles Khouzam, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 11/627,754

(22) Filed: Jan. 26, 2007

(65) Prior Publication Data
US 2008/0180456 A1 Jul. 31, 2008

(51) Int. Cl.
  H04N 5/335 (2006.01)
  H04N 9/64 (2006.01)
  G09G 5/02 (2006.01)
  G09G 5/22 (2006.01)
  G09G 5/36 (2006.01)
  G03F 3/08 (2006.01)
  G06K 9/00 (2006.01)

(52) U.S. Cl. ............ 345/589; 345/549; 345/591; 345/602; 345/559; 348/453; 348/630; 348/649; 358/518; 358/523; 382/162; 382/167; 382/274

(58) Field of Classification Search ........... 345/418, 345/427–428, 581, 589–591, 597, 600–602, 345/603–604, 536, 539, 541, 547, 549, 559; 358/515–520, 523–525; 382/162–167, 254, 382/274, 276, 300, 305; 348/496–498, 488, 348/461, 453, 557, 630, 649
See application file for complete search history.

(56) References Cited

U.S. PATENT DOCUMENTS

| 5,872,556 | A | 2/1999 | Rackley et al. | |
|---|---|---|---|---|
| 5,873,990 | A | * 2/1999 | Wojciechowski et al. | ... 204/406 |
| 5,923,316 | A | 7/1999 | Kitamura et al. | |
| 5,936,683 | A | 8/1999 | Lin | |
| 6,097,219 | A | * 8/2000 | Urata et al. | ............ 326/83 |
| 6,118,724 | A | * 9/2000 | Higginbottom | ....... 365/230.05 |
| 6,172,714 | B1 | 1/2001 | Ulichney | |
| 6,268,847 | B1 | 7/2001 | Glen | |
| 6,349,379 | B2 | * 2/2002 | Gibson et al. | ............ 712/210 |
| 6,356,277 | B1 | 3/2002 | Yajima et al. | |
| 6,384,838 | B1 | 5/2002 | Hannah | |

(Continued)

OTHER PUBLICATIONS

"An End to End Software Only Scalable Video Delivery System," http://suif.standford.edu/~bks/publications/scalable_video.ps.

(Continued)

Primary Examiner—Wesner Sajous
(74) Attorney, Agent, or Firm—Marshall, Gerstein & Borun LLP

(57) ABSTRACT

The values of each possible component output R, G, and B may be pre-computed for all values of each possible component input Y, U, and V. Each contribution of Y, U, and V input may then be loaded into a register and added in parallel, without overflow, resulting in a computationally inexpensive RGB output from a YUV input. In one embodiment, contributions of Y, U, and V to each of R, G, and B are retrieved from pre-computed tables. The YUV contributions for each value of R, G, and B are packed into three data elements and added together in parallel, resulting in a value for an RGB output.

19 Claims, 5 Drawing Sheets

300

| Y Input | Contribution to R | Contribution to G | Contribution to B |
|---|---|---|---|
| 16 | 0 | 0 | 0 |
| 17 | 1.164 | 1.164 | 1.164 |
| ... | ... | ... | ... |
| 235 | 254.916 | 254.916 | 254.916 |

| $C_b$ Input | Contribution to R | Contribution to G | Contribution to B |
|---|---|---|---|
| 16 | 0 | 44.800 | -226.016 |
| 17 | 0 | 44.400 | -223.998 |
| ... | ... | ... | ... |
| 239 | 0 | -44.400 | 223.998 |

U.S. PATENT DOCUMENTS

| | | | |
|---|---|---|---|
| 6,487,308 B1* | 11/2002 | Ulichney et al. | 382/162 |
| 6,828,982 B2 | 12/2004 | Lee | |
| 2001/0021971 A1* | 9/2001 | Gibson et al. | 712/215 |
| 2003/0052894 A1* | 3/2003 | Akiyama et al. | 345/589 |
| 2003/0120886 A1* | 6/2003 | Moller et al. | 711/173 |
| 2003/0160900 A1* | 8/2003 | Dumitras et al. | 348/649 |
| 2006/0176313 A1 | 8/2006 | Xu et al. | |

OTHER PUBLICATIONS

"Integrating Video Rendering into Graphics Accelerator Chips," http://www.hpl.hp.com/personal/Robert_Ulichney/papers/1996-graphics-chip.pdf.

"A Low-Power Video Decoder with Power, Memory, Bandwidth and Quality Scalability," http://ieeexplore.ieee.org/iel3/4015/11533/00527516.pdf?sNumber=.

"A Low-Power Multiplierless YUV to RGB Converter Based on Human Vision Perception," http://ieeexplore.ieee.org/iel2/4387/12506/00574765.pdf?sNumber=.

"RGB/YUV Pixel Conversion" http://www.fourcc.org/fccvrgb.php.

International Search Report based on International Application No. PCT/US2008/051813—Filed Jan. 23, 2008; Date of Mailing: Jul. 1, 2008.

* cited by examiner

300

| Y Input | Contribution to R | Contribution to G | Contribution to B |
|---|---|---|---|
| 16 | 0 | 0 | 0 |
| 17 | 1.164 | 1.164 | 1.164 |
| ... | ... | ... | ... |
| 235 | 254.916 | 254.916 | 254.916 |

Fig. 3a

| $C_b$ Input | Contribution to R | Contribution to G | Contribution to B |
|---|---|---|---|
| 16 | 0 | 44.800 | -226.016 |
| 17 | 0 | 44.400 | -223.998 |
| ... | ... | ... | ... |
| 239 | 0 | -44.400 | 223.998 |

Fig. 3b

| $C_r$ Input | Contribution to R | Contribution to G | Contribution to B |
|---|---|---|---|
| 16 | -178.752 | 93.072 | 0 |
| 17 | -177.156 | 92.241 | 0 |
| ... | ... | ... | ... |
| 239 | 177.156 | -92.241 | 0 |

Fig. 3c

FAST FILTERED YUV TO RGB CONVERSION

BACKGROUND

This Background is intended to provide the basic context of this patent application and is not intended to describe a specific problem to be solved.

Computer monitors emit color within a color space comprising RGB (red, green, blue) light. Although all colors of the visible spectrum can be produced by merging red, green and blue light, monitors are capable of displaying only a limited gamut (i.e., range) of the visible spectrum. Each pixel presented in the RGB format will include a separate value within a range of 0 to 255 for each of R, G, and B to produce a pixel. However, computers may also emit color within a variety of other color spaces. For example, another color space may comprise data consisting of luminance (Y), chrominance of the blue to yellow color content (U or $C_b$), and chrominance of the red to cyan color content (V or $C_r$). As with RGB, pixels in the YUV format are also comprised of separate values for each of Y, U, and V. However, the ranges for each value of R, G, and B do not correspond directly to the ranges for Y, U, and V. For example, in one YUV format, the range of values for Y is 16 to 235, while the ranges for both U and V is 16 to 239. Therefore, for a computer to properly display YUV video content in RGB, the YUV values for each pixel must be converted to corresponding RGB values.

Present methods for conversion from one video format to another are computationally expensive and may require the processing of input data through a matrix transform to produce output. To convert from YUV to RGB, data from each pixel must be processed through a matrix transform with 7 multiplication and 11 add/subtract operations. In practice, a compiler may reduce the common sub-expressions of matrix transforms. For example, the matrix transform to convert YUV to RGB may be readily reduced to 5 multiplication and 7 add/subtract operations. However, even a compiler-reduced matrix transform is computationally expensive. Due to the complexity of pixel conversion, the process typically requires extensive support to include Single Instruction, Multiple Data (SIMD) parallel processing extensions for execution within a useful time. Further, computers that are unable to implement SIMD extensions are unable to easily perform pixel conversion.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The values of each possible component output R, G, and B may be pre-computed for all values of each possible component input Y, U, and V. Each contribution of Y, U, and V input may then be loaded into a register and added in parallel, without overflow, resulting in a computationally inexpensive RGB output from a YUV input. In one embodiment, contributions of Y, U, and V to each of R, G, and B are retrieved from pre-computed tables. The YUV contributions for each value of R, G, and B are packed into three data elements and added together in parallel, resulting in a value for an RGB output.

BRIEF DESCRIPTION OF THE FIGURES

FIG. 3 may be an illustration of pre-computed tables for use with a method of converting YUV video data to RGB data for computer display;

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
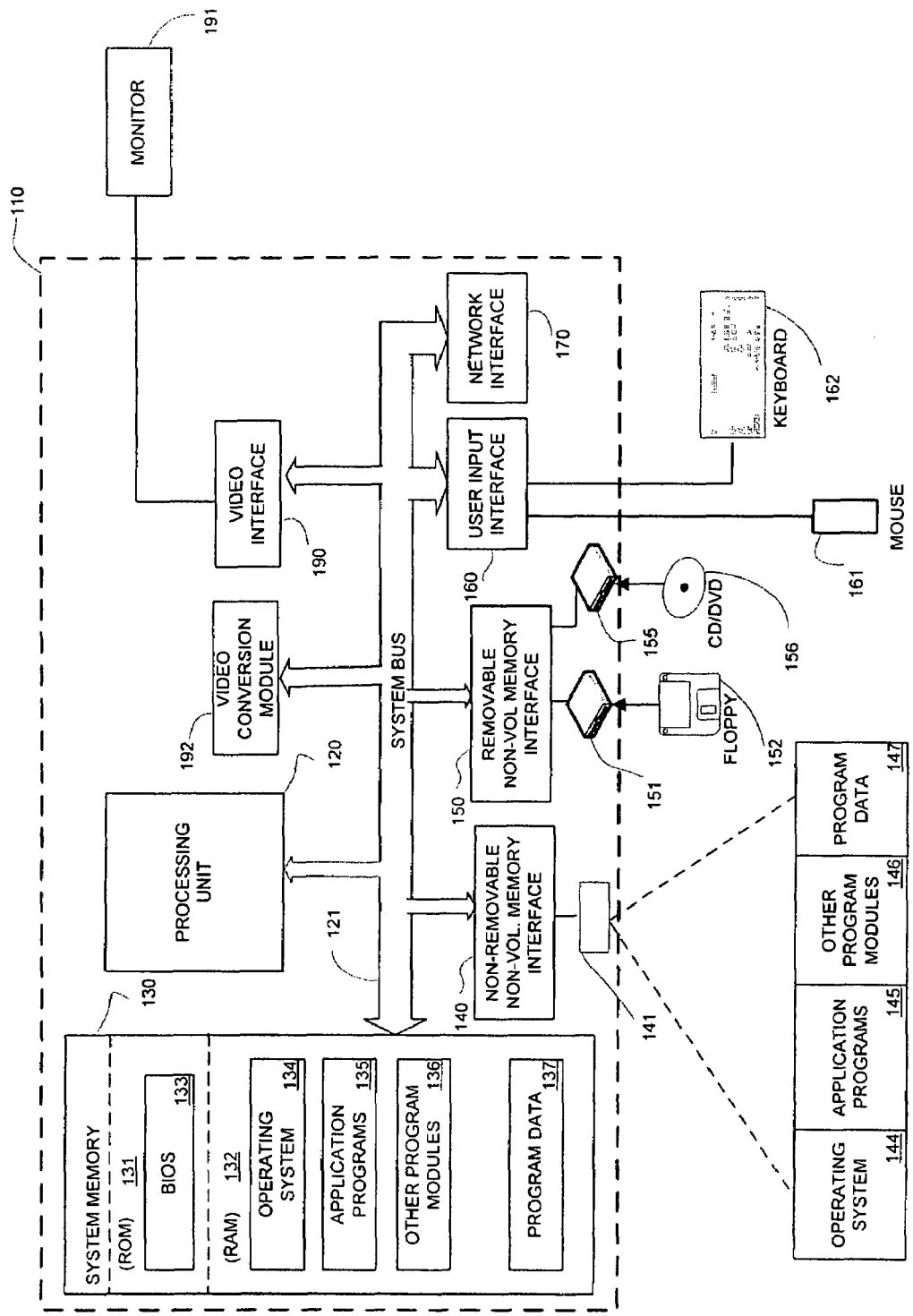
FIG. 1 may be an illustration of a computer that implements a method of converting YUV formatted data to RGB formatted data.

FIG. 1 illustrates an example of a suitable computing system environment 100 that may operate to provide the method described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method includes a general purpose computing device in the form of a computer 110. Components of the computer 110 may include, but are not limited to, a processing unit 120, a system memory 130, and a system bus 121 that couples various system components including the system memory 130 and video interface 190 to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. A video conversion module 192 may be connected to the system bus 121. The video conversion module 192 may convert or modify pixels in accordance with the method described below. In other embodiments, the video conversion module 192 is a component of another element of the computer 110. For example, the video conversion module 192 may be a component of the processing unit 120, and/or the video interface 190. In addition to the monitor 191, computers may also include other peripheral output devices such as speakers 197 and printer 196, which may be connected through an output peripheral interface 190.

Much of the inventive functionality and many of the inventive principles described herein are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will he readily capable of generating such software instructions, programs, and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 2:
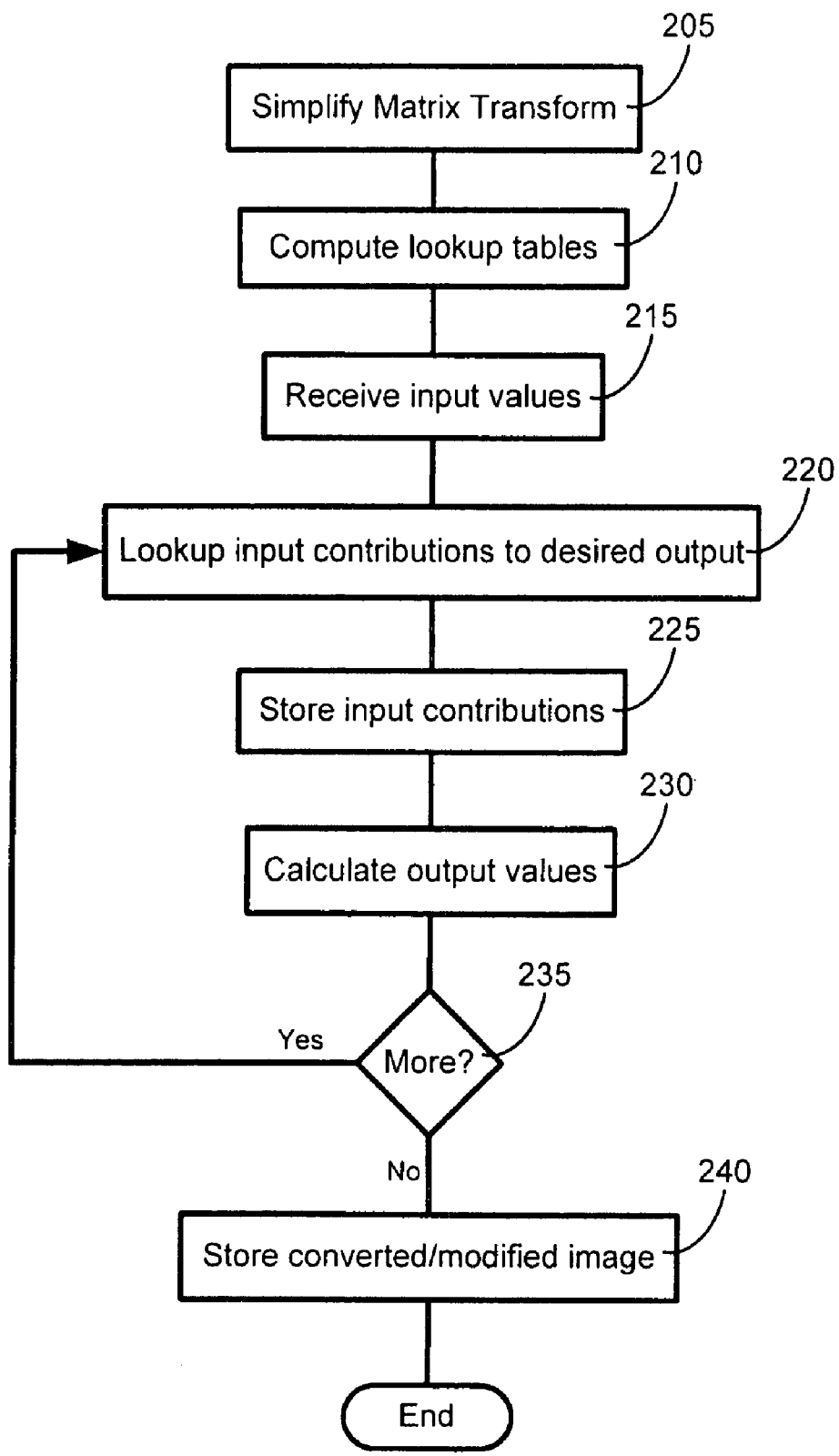
FIG. 2 may be an illustration of a method of converting YUV video data to RGB data for computer display.

FIG. 2 is an illustration of a method 200 that may convert YUV ($YC_bC_r$) formatted pixels for display in the RGB color space. The method may be executed on a variety of components of the computer 110. In one embodiment, the method 200 is executed on a video conversion module 192. In another embodiment, the method 200 is executed on the video interface 190. In a further embodiment, the method is executed with the processing unit 120. RGB, YUV, and $YC_bC_r$ may generally describe all video formats of the RBG and YUV family including, but not limited to, respectively, RGB16, RGB24, RGB32, YUV, YUY2, YV12, YV20, and I420. However, as those skilled in the art will appreciate, the method may be performed as a part of any conversion or modification that may include a per-data unit computing cost. In one embodiment, the method is used to convert video from YUV to RBG wherein the conversion requires a per-pixel computing cost.

With reference to FIG. 2, at block 205, a matrix transform may be simplified. For example, the transform may be used to convert a video image from one pixel format to another or to modify pixels of a video image. In one embodiment, a matrix transform to convert YUV formatted video images into RBG images is simplified. For example, the matrix transform of Table 1 may be simplified to compute the contributions of each of Y, U, and V to a resulting R, G, and B value.

TABLE 1 red = (Y − 16) × 1.164 + (V − 128) × 1.596
green = (Y − 16) × 1.164 + (V − 128) × 0.831 − (U − 128) × 0.400
blue = (Y − 16) × 1.164 + (U − 128) × 2.018

From Table 1, in a conversion from YUV to RGB, a value in the RGB color space for red may be composed of some degree of luminance (Y) and some degree of chrominance in the red to cyan range (V or $C_r$). Likewise, green may be composed of some degree of luminance (Y), some degree of chrominance in the red to cyan range (V or $C_r$), and some degree of chrominance in the blue to yellow range (U or $C_b$). Also, blue may be composed of some degree of luminance (Y), and some degree of chrominance in the blue to yellow range (U or $C_b$). Therefore, as in Table 2, the formula for converting YUV pixels into RGB pixels may be simplified to emphasize the contributions of the Y, U, and V components.

TABLE 2

|   | Red | Green | Blue |
|---|---|---|---|
|   | (Y − 16) × 1.164 | (Y − 16) × 1.164 | (Y − 16) × 1.164 |
| + | (V − 128) × 1.596 | (V − 128) × −0.831 |  |
| + |  | (U − 128) × −0.400 | (U − 128) × 2.018 |
| = | Red Output | Green Output | Blue Output |

As illustrated in Table 2, each of the inputs Y, U, and V contribute, in some degree, to a resulting output of Red, Green, and Blue. The total contribution of each value of Y, U, and V may be added together in planar form to produce a respective Red, Green, and Blue output value. Of course, there may be other simplifications of other matrix transforms that may emphasize component contributions.

At block 210, tables may be computed to determine all possible output values corresponding to all possible input values. The tables may consist of a number of values equaling the range of the target format. For example, where the target format is RGB and the range for each component is 0 to 255, there may be three tables of 256 values each representing an entire set of possible output values from an input. The tables may be stored in any form of computer memory described in relation to FIG. 1. In one embodiment, R, G, and B output values are computed for any possible Y, U, and V (Y, $C_b$, and $C_r$) input value. For example, as illustrated in FIGS. 3a-c, the possible input values for each of Y 305, $C_b$ 310, and $C_r$ 315 may be a value of 16-235, 16-239, and 16-239, respectively. While the contribution values of FIGS. 3a-c contain up to three significant figures, the contribution may be represented in any useful precision. The contribution of each input value to R, G, and B may be calculated using the formulae of Table 2 and inserted into a corresponding position in a set of tables 300. In one embodiment, an input 305 for Y of 17 is converted by the formula (Y−16)×1.164 to produce a table value 320 of 1.164 as the luminance contribution to each of R 325, G 330, and B 335. With reference to FIG. 3b, an input 310 for U ($C_b$) may be converted by the formulae ($C_b$−128)×−0.400 and ($C_b$−128)×2.018 to produce a table value 340 for each contribution to G 345 and B 350, respectively. With reference to FIG. 3c, an input 315 for V ($C_r$) may be converted by the formulae ($C_r$−128)×1.596 and ($C_r$−128)×−0.831 to produce a table value 355 for each contribution to R 360 and G 365, respectively. There may also be many other methods of producing pre-computed tables encompassing many different video formats for a range of outputs corresponding to a range of inputs.

At block 215, the method 200 may receive an input value for conversion. In one embodiment, pixel values are received in planar mode in response to any modification of an image that results in a per-pixel computing cost. Some examples of operations that may require a per-pixel computing cost are conversions from one video format to another (i.e., YUV to RGB), a shader transform, a lightness or brightness correction, a saturation change, or a color correction. For example, a tuple of YUV pixel values may be received by the method 200 as a plane of Y data, a plane of U data, and a plane of V data, in response to a requested conversion from the YUV format to another format (i.e., YUV to/from RGB). In a further embodiment, the method 200 receives non-planar, or "chunky" data. For example, the YUV data may be received as a single memory unit containing all three Y, U, and V values. The method 200 may consider each piece of chunky data as a 1×1 pixel plane. Each piece of chunky data may be converted into separate planes of data on a pixel-by-pixel basis. Many other embodiments for receiving and interpreting input values also exist.

At block 220, the method 200 may use the lookup tables of block 210 to find a contribution of an input to the value of an output. In one embodiment, a value from a YUV tuple is used to find its contribution to the desired output. For example, with reference to FIGS. 3a-c, a Y input 305 value of 17 may contribute 1.164 to the total value of each of an R, G, and B desired output. Also, a U ($C_b$) input 310 value of 17 may contribute 0, 44.400, and −223.998 to the total value of a respective R, G, and B desired output and a V ($C_r$) input 315 value of 17 may contribute −177.156, 92.241, and 0 to the total value of a respective R, G, and B desired output.

Figure 4:
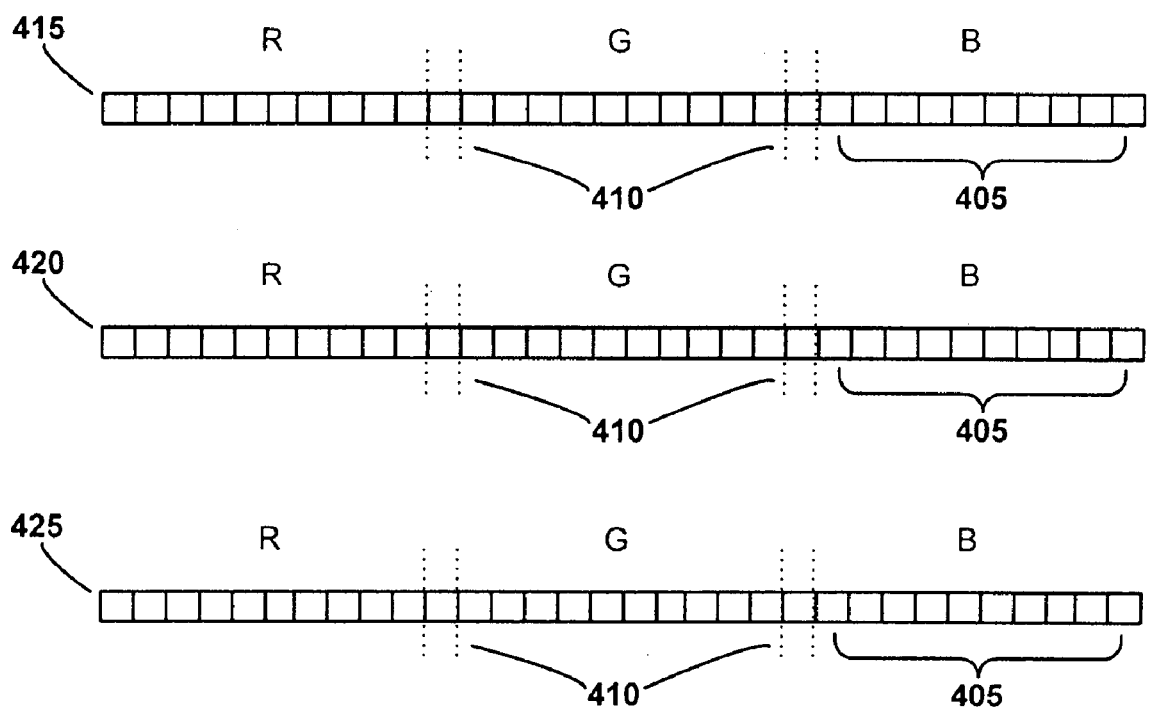
FIG. 4 may be an illustration of memory elements for use with a method of converting YUV video data to RGB data for computer display.

At block 225, the method 200 may store the input contributions of block 220. In one embodiment, each component's contributions are stored in a particular order within a single memory location. For example, the data may be stored to prevent an overflow error during a subsequent addition process. With reference to FIG. 4, the method 200 may store the contributions within a memory space that may be divided into equal portions to accommodate each contribution. For example, a memory space may be a register residing on a processing unit 120 of a computer 110. As used herein, a register may be any memory location in RAM 132, or any other discrete memory unit upon which an arithmetic function may be performed using the processing unit 120. Further, a memory space may be any fixed-sized group of bits that are handled or processed together by the computer 110. Also, in an x86 platform, a memory space may be a 16 bit word and a double word (dword) may be 32 bits long.

In one embodiment, the memory space is a 32-bit dword in which each contribution is allocated ten bits 405 of the dword with a "buffer" or "gap" 410 between each value. The buffer may be any size that is suitable to prevent an overflow error during a subsequent addition operation. For example, the buffer may be 1 bit in size. In a further embodiment, the memory space may be any structure that may allocate enough memory to store each ordered contribution described above wherein the number of memory spaces may be equal to the number of elements in a target format. For example, the format RGB is made up of three elements; therefore, the method 200 may use three memory spaces 415, 420, 425. Also, each element of a contribution tuple may be stored in the same order over multiple spaces. For example, each of three memory spaces 415, 420, 425 may have data representing a Y value stored in the first ten bits, a U value in the second ten bits, and a V value in the third ten bits, with a 1-bit buffer between each value. Therefore, the contributions of Y, U ($C_b$,), and V ($C_r$) to the components R, G, and B may be stored in a different memory space 415, 420, 425, and arranged in the order of contributions to R, contributions to G, and contributions to B. For example, an embodiment that converts YUV data to RGB, the space 415 stores, in order, the contribution of Y to each of R, G, and B, space 420 stores, in order, the contribution of U ($C_b$,) to each of R, G, and B, and space 425 stores, in order, the contribution of V ($C_r$) to each of R, G, and B. Of course, there may be many embodiments of memory spaces that store the components in a particular order as well as many sizes of the components stored.

Figure 5A:
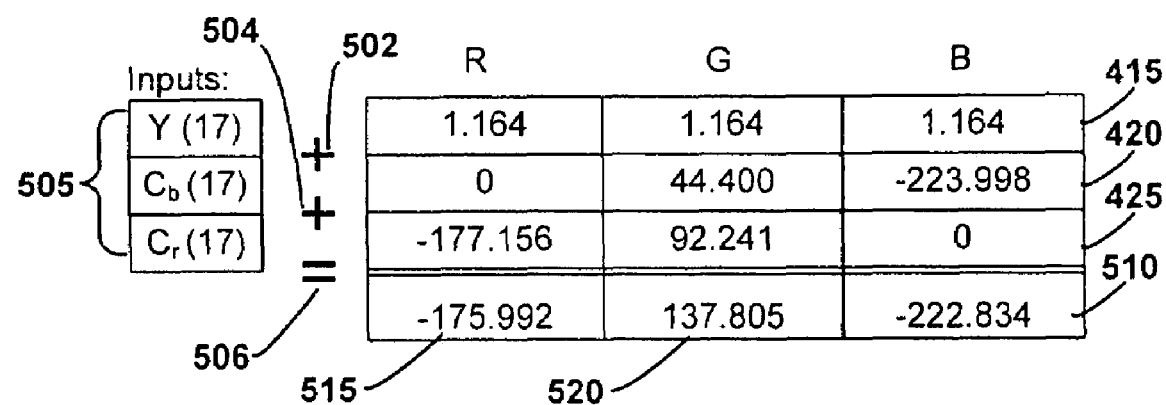
FIG. 5 may be an illustration of parallel addition of memory elements to determine an RGB output value from a YUV input.

At block 230, with reference to FIG. 5a, the method 200 may calculate output pixel values. In one embodiment, the method 200 performs two parallel addition operations 502, 504 employing the three memory spaces 415, 420, and 425. For example, the memory spaces 415, 420, and 425 may store, in order, the contributions to R, G, and B of Y, U ($C_b$,), and V ($C_r$), respectively, for each input value 505. The three values may be added together in parallel 502, 504 to calculate 506 a resulting value of R, G, and B. For example, the values may be added in parallel as three 32-bit words, resulting in two add operations 502, 504. In a further embodiment, a gap 410 prevents component values of R, G, and B from influencing each other by overflow and carrying rules associated with binary addition operations. A total value 510 for each contribution may result from the parallel addition process to produce an output value for RGB from a YUV input. The result of the parallel addition may be saved in the order R, G, and B, to a single 32-bit memory space.

Figure 5B:
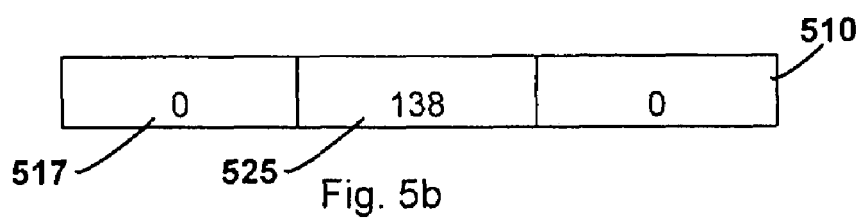

In another embodiment, the resulting total values are clipped to ensure they remain within an acceptable range for the target format. For example, with reference to FIGS. 5a and 5b, when the input YUV pixel values are 17,17,17, the total value for R may be a negative number 515. Because the allowable component values within the RGB format are between 0 and 255, a negative result may not be acceptable. Therefore, the method 200 may determine that, when converting to the RGB format, a negative number may be clipped to zero 517 to correspond to the acceptable RGB values range. Further, decimal values 520 may be rounded to an integer 525 value corresponding to a value within an acceptable output range. Likewise, a total number 510 that is above the acceptable range may be clipped to the maximum allowable value for the format. Many other embodiments of calculating the output values also exist.

At block 235, the method 200 may determine if there are more values that need to be converted. In one embodiment, the method 200 checks a buffer into which all pre-conversion pixel values are decompressed to determine if any values remain. For example, the buffer may be a FIFO queue into which YUV pixel values are loaded for processing by the method 200. If the method 200 determines that more values need to be converted, the method may return to block 220. If no values remain, the method may proceed to block 240.

At block 240, the method 200 may store the converted or modified image. In one embodiment, the method 200 stores the image directly, on a pixel-by-pixel basis, to a memory, such as a back buffer. For example, in a video display, a compositing layer may decode compressed video to YUV planes, convert the YUV planes to an intermediate RGB buffer, and merge/composite the RGB buffer to a back buffer for later display. A compositor incorporating an intermediate buffer may be useful when converting between video formats that display images at different rates. For example, video playback may operate at a frames-per-second rate that is slower than a typical digital animation sequence. Because video playback is slower, some frames of the slower format may be repeatedly displayed during playback in the faster format to account for the different rates. Rather than re-converting the same frame every time it is displayed, the converted YUV/RGB data may be saved to an intermediate buffer to achieve faster recall of previously-displayed frames. Further, where the conversion step consumes an appreciable amount of computer processing (as when the step converts using the Table 1 matrix transform for each pixel), it may be more efficient to convert a repeated frame only once and cache the resulting data. Employing the transform at each pixel conversion may, therefore, generate an additional Read/Modify/Write command for each processed pixel.

However, as described above in relation to blocks 220 through 235, the processing cost of conversion may be very low. For example, the conversion from YUV to RGB may involve only a table lookup for each target format component followed by parallel addition. Therefore, because the conversion cost may be very low, it may be performed as each pixel is decompressed on a pixel-by-pixel basis and the resulting data may be saved directly to a back buffer. Saving directly to a back buffer may eliminate an intermediate (RGB) buffer as well as a Read/Modify/Write command during the conversion process and may also improve the cache coherency. Further, the Write/Combine capabilities of certain processors may substantially improve the conversion and output performance. Of course, there are many other embodiments for storing and utilizing converted data to eliminate R/M/W commands, intermediate buffers, or hardware components employing these structures.

The invention claimed is:

1. A computing device comprising:
    a processor;
    a memory; and
    a data element modification application maintained in the memory and executed on the processor to modify an input data element, the application including one or more instructions for:
    receiving the input data element including a plurality of input values;
    retrieving a plurality of component data elements from a plurality of data tables, wherein each data table corresponds to one of the plurality of input values, and wherein each component data element includes a set of output value contributions, each output value contribution corresponding to one of a plurality of input values;
    storing each component data element in a memory space, wherein each element of the set of output value contributions is stored in the same order within each memory space;
    adding the memory spaces, wherein the sum of the memory spaces includes an output data element comprising a plurality of output values, each of the plurality of output values including a sum of all output value contributions corresponding to one of the plurality of output values; and
    placing a first buffer and a second buffer between each element of the set of output value contributions.

2. The computing device of claim 1, wherein the input data element comprises a YUV video pixel value and the output data element comprises an RGB pixel value.

3. The computing device of claim 1, wherein the plurality of input values comprises, in order, a luminance value Y, a blue to yellow chrominance value $C_b$, and a red to cyan chrominance value $C_r$.

4. The computing device of claim 1, wherein the plurality of output values comprises, in order, a red value R, a green value G, and a blue value B.

5. The computing device of claim 1, wherein each set of output value contributions comprises a set of luminance contributions or a set of chrominance contributions.

6. The computing device of claim 1, wherein the memory space is a double word and each of the plurality output value contributions occupies no more than 10 bits of the double word.

7. The computing device of claim 1, wherein each of the plurality of memory spaces includes a buffer, the buffer preventing an overflow error during addition of the memory spaces.

8. The computing device of claim 1, wherein adding the memory spaces comprises adding the memory spaces in parallel.

9. The computing device of claim 1, wherein each of the plurality of memory spaces comprises 32 bits, wherein a first ten bits of the memory space comprises a first element of the set of output value contributions, an eleventh bit of the memory space comprises a first buffer, a twelfth through twenty-first bits of the memory space comprises a second element of the set of output value contributions, a twenty-second bit of the memory space comprises a second buffer, and a twenty-third through thirty-second bit of the memory space comprises a third element of the set of output value contributions.

10. The computing device of claim 1, wherein each plurality of output value contributions includes a luminance and chrominance contribution to each of Red, Green, and Blue.

11. The computing device of claim 1, wherein a number of data tables corresponds to a number of input values of the plurality of input values.

12. The computing device of claim 1, wherein adding the memory spaces comprises adding together, in parallel, each output data element wherein a number of parallel addition operations is no more than two.

13. A computer system comprising a processor for executing computer executable code, a memory for storing data and computer executable code and an input/output circuit, the processor physically configured to execute computer executable code for:
    receiving an input pixel in a first format, the input pixel including a first and second input value;
    retrieving a first set of output value contributions from a first data table, wherein a first element of the first set of output value contributions corresponds to the first input value and a first output value, and wherein a second element of the first set of output value contributions corresponds to the first input value and a second output value;

retrieving a second set of output value contributions from a second data table, wherein a first element of the second set of output value contributions corresponds to the second input value and the first output value, and wherein a second element of the second set of output value contributions corresponds to the second input value and the second output value;

storing the first and second set of output value contributions in a first and second register, respectively, wherein each element of the first and second set of output value contributions is stored in the same order within both the first and second register;

storing a sum of the first and second registers to an output register, wherein the sum of the first and second registers comprises an output pixel in a second format, the output pixel including the first and second output value, the first output value including a sum of the first elements of both the first and second sets of output value contributions and the second output value including a sum of the second elements of both first and second sets of output value contributions.

14. The computer system of claim 13, wherein the first format comprises YUV and the second format comprises RGB.

15. The computer system of claim 13, further comprising modifying the input pixel in the first format to the output pixel in the second format, the modification including at least one of a lightness correction, a brightness correction, a contrast modification, a saturation change, a per-pixel modification, or a shader transform.

16. A method of converting a YUV pixel value to an RGB value pixel comprising:

receiving the YUV pixel value including a luminance value Y, a blue to yellow chrominance value $C_b$, and a red to cyan chrominance value $C_r$;

indexing Y to a luminance contribution value of a luminance lookup table including a plurality of luminance contribution values, the plurality of luminance contribution values corresponding to a possible range of Y and each value including a luminance contribution to at least one of Red, Green, and Blue;

indexing $C_b$ to a first chrominance contribution value of a first chrominance lookup table including a plurality of first chrominance contribution values, the plurality of first chrominance contribution values corresponding to a possible range of $C_b$ and each first chrominance contribution value including a first chrominance contribution to at least one of Green and Blue;

indexing $C_r$ to a second chrominance contribution value of a second chrominance lookup table including a plurality of second chrominance contribution values, the plurality of second chrominance contribution values corresponding to a possible range of $C_r$ and each second chrominance contribution value including a second chrominance contribution to at least one of Red and Green;

storing the luminance contribution value, the first chrominance contribution value, and the second chrominance contribution value to a first, second, and third register, respectively, wherein each register comprises a plurality of bits, wherein the first register comprises a first luminance bit set including the luminance contribution to Red, a second luminance bit set including the luminance contribution to Green, a third luminance bit set including the luminance contribution to Blue, and at least one luminance buffer, wherein the second register comprises a first chrominance bit set including the first chrominance contribution to Green, a second chrominance bit set including the first chrominance contribution to Blue, and at least one first chrominance buffer, wherein the third register comprises a third chrominance bit set including the second chrominance contribution to Red, a fourth chrominance bit set including the second chrominance contribution to Green, and at least one second chrominance buffer, adding together, in parallel, the first, second, and third registers, wherein the sum of the first, second, and third registers comprises the RGB pixel value; and the first and second luminance buffers, the at least one first chrominance buffer, and the at least one second chrominance buffer preventing an overflow error while adding together, in parallel, the first, second, and third registers.

17. The method of claim 16, wherein the first and second luminance bit sets, the first and second chrominance bit sets, and the third and fourth chrominance bit sets are stored within the respective first, second, and third registers in an identical order comprising any identical arrangement within each register of the respective luminance, first chrominance, and second chrominance contributions to Red, Green, and Blue.

18. The method of claim 16, wherein the possible range of Y comprises a value of Y greater than or equal to 16 and less than or equal to 235.

19. The method of claim 16, wherein the possible range of either $C_b$ or $C_r$ comprises a value greater than or equal to 16 and less than or equal to 239.

* * * * *